United States Patent
Bester et al.

(10) Patent No.: US 12,192,188 B2
(45) Date of Patent: Jan. 7, 2025

(54) SYSTEM AND METHOD FOR PROXIMITY-BASED AUTHENTICATION

(71) Applicant: ENTERSEKT INTERNATIONAL LIMITED, Ebene (MU)

(72) Inventors: Daniël Deetlefs Bester, Stellenbosch (ZA); Gerhard Gysbert Oosthuizen, Bellville (ZA); Francois Archibald Nolte, Stellenbosch (ZA); Petrus Johannes De Wet, Stellenbosch (ZA)

(73) Assignee: ENTERSEKT INTERNATIONAL LIMITED, Ebene (MU)

( * ) Notice: Subject to any disclaimer, the term of this patent is extended or adjusted under 35 U.S.C. 154(b) by 338 days.

(21) Appl. No.: 17/597,363

(22) PCT Filed: Jul. 10, 2020

(86) PCT No.: PCT/IB2020/056522
§ 371 (c)(1),
(2) Date: Jan. 4, 2022

(87) PCT Pub. No.: WO2021/009644
PCT Pub. Date: Jan. 21, 2021

(65) Prior Publication Data
US 2022/0255920 A1 Aug. 11, 2022

(30) Foreign Application Priority Data
Jul. 12, 2019 (ZA) .................... 2019/04570

(51) Int. Cl.
*H04L 29/06* (2006.01)
*H04L 9/08* (2006.01)
(Continued)

(52) U.S. Cl.
CPC ........ *H04L 63/0807* (2013.01); *H04L 9/0894* (2013.01); *H04L 9/3073* (2013.01);
(Continued)

(58) Field of Classification Search
CPC .................................................. H04L 63/0807
See application file for complete search history.

(56) References Cited

U.S. PATENT DOCUMENTS 8,869,243 B2  10/2014  McGeehan et al.
9,177,125 B2  11/2015  Steeves et al.
(Continued)

FOREIGN PATENT DOCUMENTS

EP    1777636 A1     4/2007
WO   2005/125084 A1  12/2005

OTHER PUBLICATIONS

International Search Report and Written Opinion issued for PCT/IB2020/056522, dated Oct. 1, 2020 in 10 pages.

*Primary Examiner* — Bradley W Holder
(74) *Attorney, Agent, or Firm* — Knobbe, Martens, Olson & Bear, LLP

(57) ABSTRACT

A system and method for proximity-based authentication are provided. The method conducted at a server includes receiving identification data from a primary user session on a session end point hosted on a computing device, the identification data being usable in linking the primary user session to a user record associated with a registered user. The server provides a token to one of the session end point and a registered end point hosted on a computing device, the registered end point associated with the user record, for local transmission from the end point for proximity-based acquisition by the other one of the session end point and a registered end point. The server receives the token from the other one of the session end point and the registered end point to establish physical proximity of the session end point and the registered end point during the primary user session.

20 Claims, 7 Drawing Sheets

(51) Int. Cl.
*H04L 9/30* (2006.01)
*H04L 9/32* (2006.01)
*H04L 9/40* (2022.01)

(52) U.S. Cl.
CPC .......... *H04L 9/3268* (2013.01); *H04L 9/3271* (2013.01); *H04L 63/0823* (2013.01)

(56) References Cited

U.S. PATENT DOCUMENTS

| | | |
|---|---|---|
| 9,298,890 B2 | 3/2016 | Bajenov et al. |
| 9,641,505 B2 | 5/2017 | Neuman et al. |
| 10,044,664 B2 * | 8/2018 | Dong ...................... H04L 51/48 |
| 2005/0105734 A1 * | 5/2005 | Buer ....................... G06F 21/35 |
| | | 380/270 |
| 2011/0219427 A1 | 9/2011 | Hito et al. |
| 2011/0293095 A1 * | 12/2011 | Ben Ayed ............. H04W 12/50 |
| | | 455/26.1 |
| 2013/0262857 A1 * | 10/2013 | Neuman ............. H04L 63/0823 |
| | | 713/155 |
| 2014/0351589 A1 | 11/2014 | Chenna |
| 2019/0074982 A1 | 3/2019 | Hughes |

\* cited by examiner

SYSTEM AND METHOD FOR PROXIMITY-BASED AUTHENTICATION

CROSS-REFERENCE TO RELATED APPLICATIONS

This application is the U.S. National Phase under 35. U.S.C. § 371 of International Application PCT/IB2020/056522, filed Jul. 10, 2020, which claims priority from South African patent application number 2019/04570 filed on 12 Jul. 2019, which is incorporated by reference herein.

FIELD OF THE INVENTION

This invention relates to authentication in online transactions. In particular, the invention relates to identifying a browser instance in a browser session with a server and to proximity-based authentication.

BACKGROUND TO THE INVENTION

Transactions of various types are carried out by users online using web domains hosted by service providers and accessed via a web browser on a user's computing device. As an example, a user may use an online banking web domain to access their bank account and carry out internet banking transactions.

Various method of user authentication are known with a common form being multi-factor authentication used to prevent unauthorised users from illegitimately authorising payments or gaining access to a legitimate user's account without the knowledge of the user.

Multi-factor authentication combines at least two independent credentials, generally referred to as authentication factors, to verify the identity of the user. These authentication factors include: knowledge (something the user and only the user knows), possession (something the user and only the user has), and inherence (something the user and only the user is). Multi-factor authentication therefore provides a form of a layered defence which may make it more difficult and burdensome for unauthorised users, such as fraudsters, to gain access to an account or authorise a transaction. If one factor is compromised or breached, the fraudster still has at least one more factor to breach before successfully authorising a payment or gain access to an account.

While these multi-factor authentication systems and methods may have greatly reduced illegitimate transactions being performed, there are still numerous ways of obtaining the required information from users and using the information to authenticate transactions by posing as the legitimate user. Social engineering and phishing attacks for example have remained prevalent notwithstanding best efforts of financial institutions. In the context of information security, the term "social engineering" typically refers to psychological manipulation of people into performing actions (e.g. divulging confidential information) or otherwise influencing a person into taking an action that may or may not be in their best interests.

A typical example in the case of financial transactions is when a fraudster phones a user having an account at a financial institution, such as a bank. The fraudster may already have access to one authentication factor of the user, such as a username and password (the knowledge factor) which had been illegitimately obtained by phishing or the like. The fraudster may thus breach the first level of authentication by using the obtained username and password of the legitimate user. The fraudster may then contact the user, purporting to be a representative from the user's bank, and may for example state that the bank is conducting tests to ensure that its systems are functioning correctly. The fraudster may for example inform the user that the user may be prompted with an authentication request on a device associated with the user account (the possession factor) and may ask that the user accept the request when prompted. The user, believing that the fraudster is indeed a representative from the bank, may consequently accept the fraudster's authentication request and the fraudster may then have successfully breached the second level of authentication. Thus, although a seemingly legitimate acceptance of an authentication request is received by the financial institution, the user, having been misled, has not truly accepted the authentication request. Nevertheless, the fraudulent transaction may be allowed to proceed on the basis of the accepted authentication request.

From a technical perspective, acceptance of an authentication request received from a user having full knowledge of the transaction to which the request relates may be indistinguishable from one where the user has been misled or otherwise influenced into submitting the acceptance. Accordingly, there is scope for improvement.

While this is merely one example of how security offered by multi-factor authentication may be overcome, it should be appreciated that there may be many more such methods that fraudsters may implement to authenticate transactions and gain access to user accounts without the user being aware that these are malicious attempts by the fraudsters.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a computer-implemented method for proximity-based authentication, the method conducted at a server comprising: receiving identification data from a primary user session on a session end point hosted on a computing device, the identification data being usable in linking the primary user session to a user record associated with a registered user; providing a token to one of the session end point and a registered end point hosted on a computing device, the registered end point associated with the user record, for local transmission from the end point for proximity-based acquisition by the other one of the session end point and a registered end point; and, receiving the token from the other one of the session end point and the registered end point to establish physical proximity of the session end point and the registered end point during the primary user session.

The method may include: receiving and interpreting risk data to determine a risk level associated with the primary user session; detecting that the risk level exceeds a predetermined threshold; and, in response to the detection, providing the token.

Providing a token may be initiated in response to receiving a possession-based authentication response purporting to establish possession of the registered end point uniquely associated with the user record.

The token may be provided to the session end point, and wherein the method includes transmitting an acquisition prompt message to the registered end point prompting acquisition of the token from the primary user session using the registered end point.

The acquisition prompt message may include a report initiation element which initiates transmission of a report message to the server, wherein the report message reports suspicious activity.

The method may include: receiving the possession-based authentication response from the registered end point; and, verifying the received possession-based authentication response including confirming that the possession-based authentication response is received from the registered end point, wherein the possession-based authentication response indicates the registered user's intention to conduct a transaction.

The method may include utilising a challenge-response authentication to authenticate the primary user session; wherein the challenge-response authentication is utilised to determine a trust indicator of the primary user session, and if the trust indicator is insufficient, requiring the proximity-based acquisition to be performed by the registered end point.

The primary user session may be a browser session and receiving the identification data from the browser session includes receiving a challenge-response including a challenge having been signed with a private key unique and accessible to the browser session and having a corresponding public key associated with the user record. The challenge-response may be received together with a browser certificate, wherein the browser certificate is stored in a secure storage location accessible to the browser session while the browser session is active, and wherein the browser certificate includes the public key associated with the user record. The browser certificate may be generated by a certificate authority which is in communication with the server and the method includes validating the browser certificate, and if the bowser certificate is valid, linking the browser session to the user record.

The risk data may include one or more risk factors of the primary user session selected from a list including: data relating to user characteristics, device characteristics, browser location, user behavioural data, or a lack of a legitimate browser fingerprint. The method may include monitoring the risk data, and uniquely associating the risk data with the user record, and wherein determining the risk level includes comparing current risk data to previously monitored data associated with the user record.

The identification data may include any one or more of: a user name, a user password, a browser certificate, a browser fingerprint, or user biometrics which are associated with the user record.

In accordance with another aspect of the invention there is provided a computer-implemented method for proximity-based authentication, the method conducted at a computing device comprising: transmitting identification data from a primary user session to a server, the identification data being usable in linking the primary user session to a user record associated with a registered user; either: receiving a token from the server; and, outputting the token for proximity-based acquisition by a registered end point associated with the user record; or: acquiring a token by proximity-based acquisition from a registered end point associated with the user record; and, transmitting the token to the server to establish physical proximity of the registered end point and computing device of the primary user session.

The method may include receiving a prompt to output the token or to acquire the token from a registered user device.

The method may include transmitting risk data to the server for interpretation by the server in determining a risk level associated with the primary user session.

In accordance with another aspect of the invention there is provided a system for proximity-based authentication, the system including a server having a memory for storing computer-readable program code and a processor for executing the computer-readable program code, the system comprising: an identification data receiving component arranged to receive identification data from a primary user session on a session end point hosted on a computing device, the identification data being usable in linking the primary user session to a user record associated with a registered user; a token providing component for providing a token to one of the session end point and a registered end point hosted on a computing device, the registered end point associated with the user record, for local transmission from the end point for proximity-based acquisition by the other one of the session end point and a registered end point; and, a token receiving component for receiving the token from the other one of the session end point and the registered end point to establish physical proximity of the session end point and the registered end point during the primary user session.

The system may include: a risk evaluation component for receiving and interpreting risk data to determine a risk level associated with the primary user session; and, a detection component for detecting that the risk level exceeds a predetermined threshold.

In accordance with another aspect of the invention there is provided a computer program product for proximity-based authentication, the computer program product comprising a computer-readable medium having stored computer-readable program code for performing, at a server, the steps of: receiving identification data from a primary user session on a session end point hosted on a computing device, the identification data being usable in linking the primary user session to a user record associated with a registered user; providing a token to one of the session end point and a registered end point hosted on a computing device, the registered end point associated with the user record, for local transmission from the end point for proximity-based acquisition by the other one of the session end point and a registered end point; and, receiving the token from the other one of the session end point and the registered end point to establish physical proximity of the session end point and the registered end point during the primary user session.

In accordance with another aspect of the invention there is provided a computer-implemented method for validation of a possession-based authentication response to prevent a social engineering attack on a user, the method conducted at a server comprising: receiving identification data from a browser session, the identification data being usable in linking the browser session to a user record associated with a registered user; receiving and interpreting risk data to determine a risk level associated with the browser session; detecting that the risk level exceeds a predetermined threshold; in response to the detection and in response to receiving a possession-based authentication response purporting to establish possession of a registered device uniquely associated with the user record, providing a token to the browser session for proximity-based acquisition by the registered device associated with the user record; and, receiving the token from the registered device to establish physical proximity of the registered device and the browser session.

The method may include transmitting an acquisition prompt message to the registered device prompting acquisition of the token from the browser session using the registered device. The acquisition prompt message may include a report initiation element which initiates transmission of a report message to the server, wherein the report message reports suspicious activity.

Further features provide for the method to include: receiving the possession-based authentication response from the registered user device; verifying the received possession-based authentication response including confirming that the received possession-based authentication response originates from the registered user device; and, for the possession-based authentication response to be indicative of the registered user's intention to conduct a transaction.

Still further features provide for the method to include utilising a challenge-response authentication to authenticate the browser session; for the step of receiving the identification data from the bowser session to include receiving a challenge-response including a challenge having been signed with a private key unique and accessible to the browser session and having a corresponding public key associated with the user record.

Yet further features provide for the challenge-response to be received together with a browser certificate; for the browser certificate to be stored in a secure storage location accessible to the browser session while the browser session is active; and, for the browser certificate to include the public key associated with the user record.

Further features provide for the method to include validating the browser certificate and if the bowser certificate is valid, linking the browser session to the user record, for example by utilising an enrolment process to enrol the browser session; for the browser certificate to be generated by a certificate authority; and, for the certificate authority to be in communication with, or to have access to, or to form part of the server.

Still further features provide for the method to include utilising the challenge-response authentication to determine a trust indicator of the browser session, and if the trust indicator is insufficient, requiring the proximity-based acquisition to be performed by the registered user device.

Yet further features provide for the risk data to include one or more risk factors, including: data relating to user characteristics, device characteristics, browser location, user behavioural data, and/or lack of a legitimate browser fingerprint; for the user characteristics, device characteristics, browser location, user behavioural data and browser fingerprint to be monitored by the server; for the risk factors to be uniquely associated with the user record; and, for the step of determining the risk level to include comparing current risk data to previously monitored data associated with the user record.

Further features provide for the user behavioural data to include data relating to user typing speed, number of user errors made, or the like; and, for device characteristics to include data relating to device location, device identity, device type, or the like.

Still further features provide for the registered user device to be registered at the server and associated with the user record so as to be uniquely identifiable by the server; and, for the method to include utilising a known characteristic or communication address of the registered user device such as a mobile station international subscriber directory number (MSISDN) thereof, to associate it with the user record.

Yet further features provide for the step of receiving the possession-based authentication response purporting to establish possession of the registered device to include receiving an illegitimate or untrusted authentication response originating from an unscrupulous or untrusted source; alternatively, for the method to include determining a source location where the purported possession-based authentication response originates from and if that source location differs from a location of the browser session, providing the token to the browser session for proximity-based acquisition by the registered device associated with the user record.

Further features provide for the token provided to the browser session to be an encrypted token including an encrypted payload; for the encrypted token to include a nonce; for the encrypted token to be a code such as a Quick Response (QR™) code.

Still further features provide for the identification data to include any one or more of: a user name, a user password, a browser fingerprint, user biometrics, or the like which are stored or associated with the user record.

Yet further features provide for the user to be pre-registered or enrolled for a service provided by an entity operating the server; for the service to be a banking service; for the entity to be a financial institution such as a bank; for an application to be downloadable and installable onto the registered device of the user to facilitate the method; and, for the method to include enrolling the application, the user and the registered device at the server.

In accordance with a further aspect of the invention there is provided a computer-implemented method for validation of a possession-based authentication response to prevent a social engineering attack on a user, the method conducted at a computing device comprising: transmitting identification data from a browser session to a server, the identification data being usable in linking the browser session to a user record associated with a registered user; transmitting risk data to the server for interpretation by the server in determining a risk level associated with the browser session; receiving a token from the server; and, outputting the token for proximity-based acquisition by a registered device associated with the user record, wherein the registered device transmits the token to the server to establish physical proximity of the registered device and the browser session.

In accordance with another aspect of the invention there is provided a system for validation of a possession-based authentication response to prevent a social engineering attack on a user, the system including a server having a memory for storing computer-readable program code and a processor for executing the computer-readable program code, the system comprising: an identification data receiving component arranged to receive identification data from a browser session, the identification data being usable in linking the browser session to a user record associated with a registered user; a risk evaluation component for receiving and interpreting risk data to determine a risk level associated with the browser session; a detection component for detecting that the risk level exceeds a predetermined threshold; a token providing component for, in response to the detection and in response to receiving a possession-based authentication response purporting to establish possession of a registered device uniquely associated with the user record, providing a token to the browser session for proximity-based acquisition by a registered device associated with the user record; and, a token receiving component for receiving the token from the registered device to establish physical proximity of the registered device and the browser session.

In accordance with another aspect of the invention there is provided a computer program product for validation of a possession-based authentication response to prevent a social engineering attack on a user, the computer program product comprising a computer-readable medium having stored computer-readable program code for performing, at a server, the steps of: receiving identification data from a browser session, the identification data being usable in linking the browser session to a user record associated with a registered user; receiving and interpreting risk data to determine a risk level associated with the browser session; detecting that the risk level exceeds a predetermined threshold; in response to the detection and in response to receiving a possession-based authentication response purporting to establish possession of a registered device uniquely associated with the user record, providing a token to the browser session for proximity-based acquisition by the registered device associated with the user record; and, receiving the token from the registered device to establish physical proximity of the registered device and the browser session.

Further features provide for the computer-readable medium to be a non-transitory computer-readable medium and for the computer-readable program code to be executable by a processing circuit.

Embodiments of the invention will now be described, by way of example only, with reference to the accompanying drawings.

DETAILED DESCRIPTION WITH REFERENCE TO THE DRAWINGS

Figure 1:
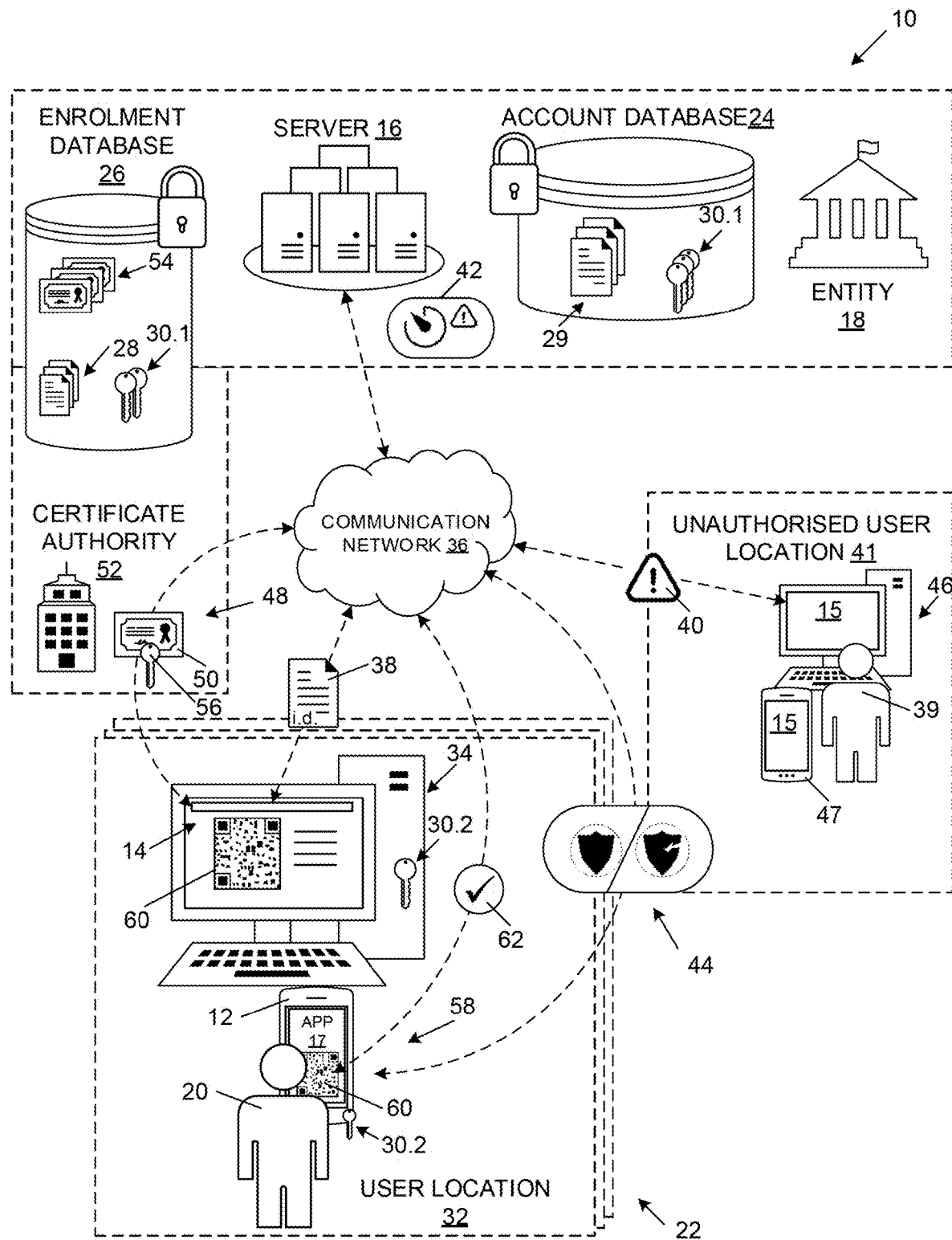
FIG. 1 is a schematic diagram which illustrates an exemplary embodiment of a system in accordance with an aspect of the present disclosure.

Methods and systems are described for an aspect of identifying a browser instance in a browser session with the browser instance executing on a user computing device and using the identification of the browser instance for authentication purposes. This may have various applications including authenticating a browser instance as being associated with a user. A browser session is defined as a session over a period of time in which a browser instance executing on a user computing device interacts with a server addressable via a domain name. A browser instance is defined as an instance of a web browser in the form of a software application for accessing information provided by remote servers and that is executing on a particular user computing device. Browser instances may be from one of various types of user computing devices including desktop computers, laptops, tablets, smartphones, or any computing device that can execute browser software. The remote servers providing the accessible information may be part of the World Wide Web accessible via the Internet. The term web browser is used broadly to also include accessing enterprise information provided by remote servers accessible via an intranet.

A browser instance may be used to access a web domain hosted or provided by a remote server. During an active browser session with the web domain, the browser instance may be authenticated by a private/public key pair unique to the combination of the web browser instance and the web domain and an associated browser certificate obtained from a certificate authority. The private key is stored at a storage provided by the browser instance for use by the browser instance during an active browser session with the web domain and in which the private key is stored as unextractable from the storage. The public key and/or the browser certificate may also be stored at the browser instance storage but as extractable for use during an authentication process. The browser instance may obtain and store the key pair and the browser certificate following instructions provided by the server hosing the web domain. This may use web application programming interfaces (API) available to the browser.

Identifying a browser instance on a user computing device for authentication purposes may associate browser instances during browser sessions with a registered user of a web domain hosted by a server and providing authentication in the browser session.

User credentials may be received at a backend or server during a browser session executed on a user computing device such as a personal computer. The credentials or identification data may include data associated with the user, such as a username and password, a browser fingerprint, a browser certificate (if available) or the like, and may be used by the server to associate the browser instance to a user account or user record associated with a registered user. The user may be pre-registered for use of a service provided by the backend or server.

The user record may be stored on a database maintained by the server. The user record may include a browser certificate provisioned to the web browser and linked to the user during enrolment of the user. The browser certificate may for example include a unique identifier, which may be stored in the user record and used to link the browser certificate to the user record.

The private key may be used for signing and cryptographic operations during a browser session with a browser instance. A cryptographic operation may include a challenge-response-based authentication of the browser. Successful challenge-response authentication of the browser may be used as a positive trust indicator. The server may use the positive trust indicator as a prerequisite for requiring fewer factors of authentication. In other words, a consequence of successful challenge-response authentication may be that only knowledge (user name and password) may for example be required by the server to authenticate the browser session and/or the user and/or a transaction or action intended to be performed by the user, as opposed to, for example, knowledge and possession. In some cases, depending on risk factors successful challenge-response authentication using the browser certificate may obviate the need for further user authentication. Other examples of signing and cryptographic operations may include providing a proof of a browser session activity and/or receiving secure messages during a browser session at a browser instance.

Methods and systems are described for another aspect of the present disclosure for proximity-based authentication of two user computing devices, for example, for validation of a possession-based authentication response. As will be explained in greater detail below, validation of a possession-based authentication response may be performed to prevent a social engineering attack on a user. In this aspect, a primary user session may be carried out between a session user device and a remote server. For example, a primary user session may be a browser session or application session from a user device in the form of any computing device. In order to authenticate that a registered user device registered for the purposes of two factor authentication is at the same location as the session user device, a proximity-based authentication is provided between the session user device and the registered user device. One of the two devices receives a token from the server that must be acquired by the other of the two devices and returned to the server to prove the co-location or proximity of the two devices. This proximity-based authentication may be used in a number of situations as a first order authentication or as a supplementary form of authentication. In one example embodiment, the proximity-based authentication may be used when a browser certificate is not available for a browser session due to a user using an unknown browser instance and/or due to risk data exceeding one or more predefined thresholds.

FIG. 1 is a schematic diagram which illustrates an exemplary embodiment of a system (10) according to aspects of the present disclosure. Various combinations of the described features and aspects may be used in a given implementation.

Referring to FIG. 1, the system (10) may include a server (16) which may be any suitable computing device performing a server role such as a server cluster, a distributed server, a cloud-based server or the like. The server (16) may be operated by an entity (18) providing a service to a user (20). In the example embodiment, the entity may be a bank or financial institution and the user (20) may be a legitimate user of an electronic banking service provided by the bank (18). A plurality of other legitimate users (22) may also make use of the system (10). The user (20) may be located at a first user location (32) and the other users (22) may be located at different locations. The server may host or provide a web domain which is accessible by a user computing device via the communication network and a browser instance executing on the user computing device. The server and/or web domain may be addressable by the browser instance via a domain name (such as 'example.com'). The web domain may include a website, web portal, or the like. A browser session may refer to a session between a browser instance and a web portal that is active for a period of time. A browser session may be initiated and terminated. For example, the browser instance may initiate a browser session with the web domain and then terminate it after a period of time. Another browser session between the browser instance and the web domain may be initiated again at another point in time. Aspects of the present disclosure relate to identifying a browser instance over successive browser sessions between the browser instance and a particular web domain. The browser instance identification may be secure through use of a private key that is unique to the browser instance and web domain and that is unextractable (and hence cannot be retrieved or copied).

It should be appreciated that some of the components of the system (10) may be provided or maintained by the bank directly, or by a third party which for example manages security or authentication features of the electronic banking service. The system (10) is however not limited to electronic banking services and may extend to other applications or entities such as companies, other financial institutions, governmental or educational organisations etc. The physical location of the server (16) may be unknown and/or irrelevant to users (22) making use of its functionality. The server (16) may have access to one or more secure databases, for example an account database (24) and an enrolment database (26). It will be appreciated that embodiments are possible where the account database (24) and the enrolment database (26) are one and the same, or where these are separately maintained databases. A user record (28) may be stored in the enrolment database (26) and a user account (29) (or user profile) may be stored in the account database (24). The user record (28) may be linked to the user account (29).

A plurality of public keys (30.1), each being associated with a user, may also be stored by the server (16). The public keys (30.1) may be stored in the enrolment database (26), or in the account database (24). In some implementations, each user (20) is associated with a plurality of unique public keys (30.1). Each of the public keys (30.1) associated with a particular user (20) may be configured for identification of a registered user device (12) and one or more trusted browsers, respectively. In other words, the user (20) may have a public key associated with his/her registered user device (12) and another public key associated with a trusted browser instance executing on a user computing device (34). The public key associated with the trusted browser instance may be unique to the browser instance and a web domain hosted or provided by the server. Private keys (30.2) corresponding to the public keys (30.1) may be stored in the devices/browsers with which they are associated (e.g. in the registered user device (12) and a portion of memory of the user computing device (34) allocated to the browser, respectively). Provision may be made for secure storage of the private keys (30.2) (e.g. using a secure storage location accessible only to the software application executing on the registered user device (12) and the browser instance, respectively). The public and private key pairs (30.1, 30.2) may be used in challenge-response based authentication. In some implementations, a public and private key pair issued to a browser and uniquely associated with the user account may be used to implement a FIDO2—(a trade mark of the FIDO ALLIANCE) challenge-response authentication of browser sessions and/or web browser instances.

A browser session (14) may be established by the user (20) by utilising a web browser instance executing on a user computing device (34) associated with the user (20), for example a personal computer located at the user location (32). The user computing device (34) as well as the registered user device (12) may be able to communicate with the server (16) via a communication network (36), for example, the Internet. The user may initiate the browser session (14) between user computing device (34) and the server to access a web domain hosted by the server, and for example log in to a banking website using a username and password (or other credentials). Identification data (38) may be transmitted via the browser session (14) to the server via the communication network (36). The identification data (38) may be usable in linking the web browser instance and/or browser session (14) to the user record (28) associated with the legitimate or registered user (20). The identification data (38) may include any one or more of: a username (or user login), a browser certificate, a browser fingerprint, or the like, some of which may be stored at or associated with the user record (28).

The server (16) may be arranged to receive and to interpret risk data (40) to determine a risk level (42) associated with the browser session (14), and/or to distinguish a legitimate browser session (14) from a different, unidentified, unauthorised, or generally untrusted browser session (15), as will be discussed in more detail below.

In some implementations, a browser certificate (50) may be generated, provisioned, and/or issued by a certificate authority (CA) (52) which may be in communication with, or have access to, the server (16). The browser certificate may be a X.509 certificate and may include a unique identifier, which may for example be generated and/or signed by the CA and uniquely associated with the browser certificate. The unique identifier may be globally unique identifier. The CA (52) may form part of the server (16) or may be provided or hosted by an independent third party which is trusted by the entity (18) and other entities. In some implementations, the CA may implement closed PKI (public key infrastructure) in terms of which proprietary PKI software issues digital certificates to a limited, controlled community of users. In such an implementation, root certificates are not available to browsers or other applications. This is different from a CA implementing open PKI in terms of which applications can interface seamlessly with certificates issued under an open PKI, the roots of which are already embedded. In other implementations, the CA may however implement open PKI. In some implementations, the server uses the same CA (52) for its PKI operations (e.g. secure connections) used by the browser instance and/or software application on a registered user device.

Authorised issued browser certificates (54) of a plurality of browsers may be securely stored in the enrolment database (26) and may be linked to corresponding user accounts or user records (e.g. via the unique identifier). The server (16) may be arranged to validate a browser certificate (50) received from the browser session. This may include requesting validation of the received browser certificate from the CA (52) and/or checking or verifying whether the received browser certificate (or components thereof) matches an authorised browser certificate (54) stored in, or associated with the user record (28). The server computer may be configured to identify a user record associated with a received browser certificate, for example using a unique identifier included in the browser and stored in the corresponding user record. If the received bowser certificate (50) matches the authorised browser certificate (54) for the user record (28) of the legitimate user (20) the server may be arranged to link the web browser and/or browser session (14) to the user record (28). In some implementations, this linking is dependent on validation of a challenge-response received from the browser instance. The browser certificate (50) may be securely stored by the web browser and may be accessible to the browser session only while the browser session (14) is active. In other words, browser certificates being unique to another web domain may be inaccessible to the browser instance while the browser session between the browser instance and the server and its web domain is active. The browser certificate (50) may include a public key (56) associated with the user record (28).

The browser certificate (50) may be used in a challenge-response authentication (48) utilised by the server (16) to authenticate the browser session (14). Receiving identification data (38) from the bowser session (14) may include receiving the browser certificate together with a challenge-response. The challenge-response may include a challenge having been signed or encrypted by a private key (30.2) securely stored at the computing device (34) and accessible (only) to the browser. The challenge may have been transmitted to the browser by the server (16) and may include a nonce or other cryptographic token. The server (16) may be able to validate the challenge-response by decrypting it using the public key (30.1) stored in the user record (28) and/or extracted from the browser certificate and corresponding to the private key (30.2).

Such challenge-response authentication (48) may be used to determine a trust indicator of the browser session (14). If the trust indicator is insufficient or not present, as well as the risk level (42) exceeding the predetermined threshold, the server (16) may require the user (20) to perform a proximity-based acquisition (58) using the registered user device (12). Security may thus be stepped-up or increased when the trust indicator of the browser session (14) is insufficient or not present as well as the risk level (42) exceeding the threshold, for example in response to the server (16) receiving the possession-based authentication response (44) purporting to establish possession of the registered device (12).

The registered user device (12) may for example be a portable electronic device, such as a mobile phone (or smart phone), tablet computer, wearable computing device, personal digital assistant, laptop computer or the like. The registered user device (12) may for example be a mobile device of the user (20) which may have been pre-registered or enrolled by the user (20) for use of the system (10). A software application (17) may execute on the registered user device (12) and in some implementations, registration of the registered user device (12) may entail registration of the software application (17). The registered user device (12) and/or software application (17) may be associated with a unique identifier. The unique identifier may include or be derived from one or more of: the private key (30.2) corresponding to the public key (30.1) associated with the user record (28) at the server (16); a registered device certificate associated with the public/private key pair; and, one or more hardware descriptors of hardware components in the device, such as an International Mobile Equipment Identity (IMEI) number, a memory size, an amount of network interfaces, a central processor unit (CPU) serial number, a hard drive serial number, or the like. The registered device certificate and one or more hardware descriptors may be stored in the user record (28) and thereby associated with the user (20).

The server (16) may associate or link the registered user device (12), or the unique device identifier, with the user record (28) of the user (20) by way of a suitable enrolment process, as is well known in the art. The user account (29) may further be associated with a communication address of the registered user device (12), such as a mobile station international subscriber directory number (MSISDN) thereof or other identifier or address by way of which messages, notifications, etc. may be transmitted from the server to the registered user device. The server (16) may be enabled to associate the registered user device (12) with the user record (28), so as to be uniquely identifiable by the server.

In the example scenario shown in FIG. 1, the legitimate user (20) may be able to interact with the server (16) (e.g. to transact against the user account (29)) via the browser session (14) at the user computing device (34). The user (20) may for example provide identifying data such as a username and password to the server (16) via the browser session (14) in order to authenticate him/herself to the server (16) and to be able to commence transacting against the user record (28). Such a browser session may be termed a "legitimate browser session" herein, in that the legitimate user is in control of the browser session.

Figure 2:
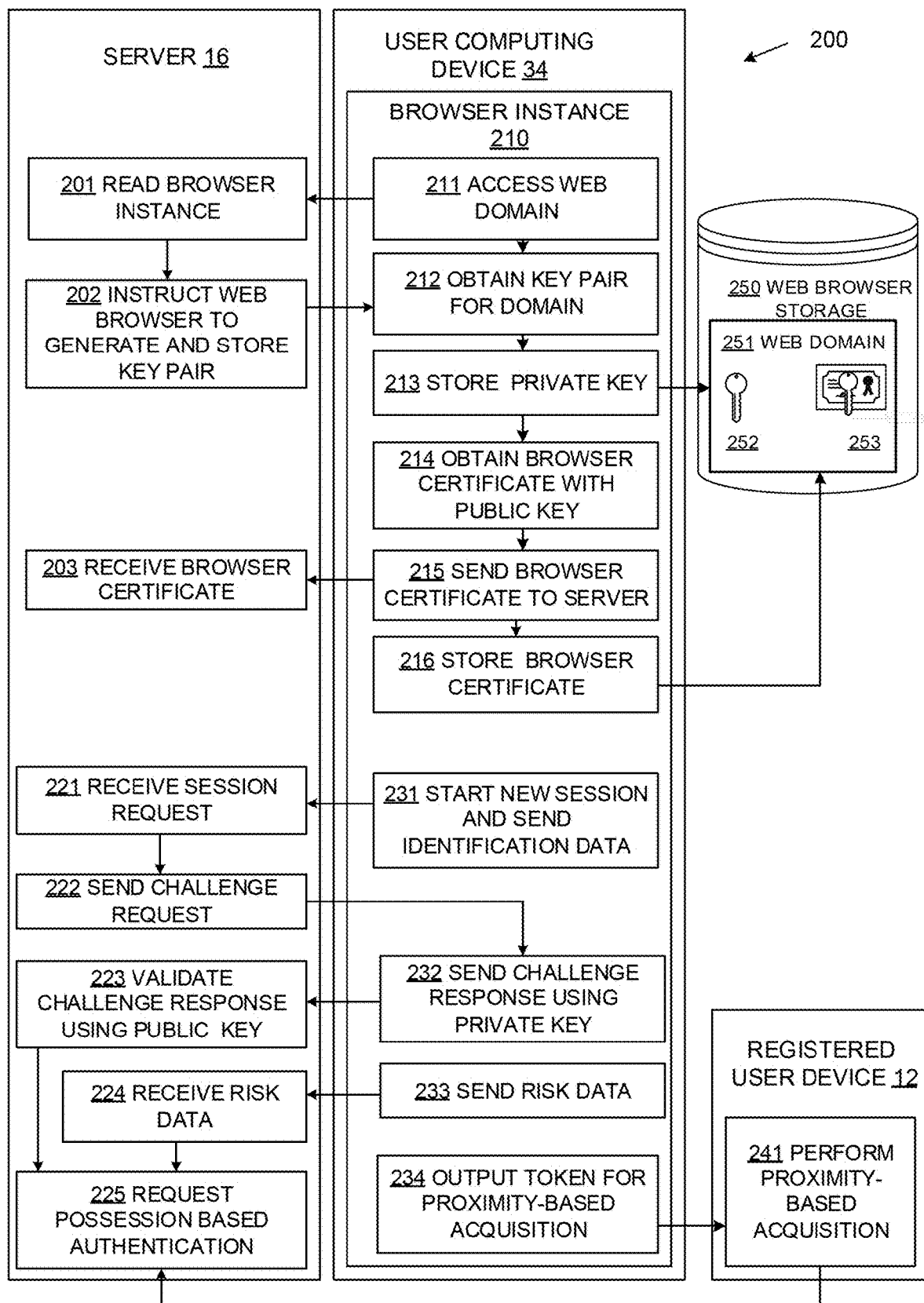
FIG. 2 is a swim-lane flow diagram which illustrates an exemplary method in accordance with an aspect of the present disclosure for identifying a browser session.

Referring to FIG. 2, a swim-flow diagram (200) shows an example embodiment of a computer-implemented method for identifying a browser session from a browser instance on a user computing device, the browser session being between a server addressable via a domain name and the browser instance executing on the user computing device. The method may associate a browser session with a registered user for the purpose of conducting a secure transaction against an account associated with the registered user via the browser session. Other uses of the identification of a browser session or a browser instance accessing a web domain may include providing a proof of a browser session activity or receiving secure messages during a browser session at a browser instance.

The swim-lane flow (200) illustrates browser sessions between a server computer (16) addressable via a domain name and a web browser instance (210) executing on a computing device (34). The method (200) may include a registration session in which a web domain accessed via the web browser instance (210) is registered (211) with the server (16).

When a browser instance (210) accesses (211) the web domain, the server (16) may read (201) the browser session to ascertain if a key pair and/or browser certificate already exist for the browser instance and web domain combination. This may include the server providing or transmitting instructions to the browser instance in a browser session with the web domain which cause the browser instance to determine if a browser certificate exists for the web domain. This may include requesting the browser certificate and the browser instance responding with the browser certificate, if available. If they do exist, an identifier may be provided in the browser certificate identifying the browser instance and, optionally, an associated registered user.

If they do not exist, the server (16) may instruct (202) the web browser instance (210) to obtain (212) a key pair using a web cryptography application programming interface at the browser instance (210) without user input. The key pair may be obtained (212) using a web cryptography application programming interface (API) such as Web Cryptography API recommended by the World Wide Web Consortium for performing cryptographic operations in web applications including generating and managing keying material. Obtaining the key pair may include the browser instance generating the key pair locally on the computing device, which may include generating the key pair using randomness generated in accordance with the Web Cryptography API. The private key (252) is stored (213) at a storage (250) provided by the browser instance that is accessible (or usable) to only the browser instance during an active browser session with the web domain (251) and in which the private key is stored as unextractable from the storage.

The server (16) may also instruct (202) the web browser instance (210) to obtain (214) a browser certificate (253) for the key pair using a certificate application programming interface at the browser instance (210) without user input. The browser certificate may be an X.509 certificate that defines public keys according to the X.509 standard. The browser certificate may be obtained from or be sent to a certificate authority for signing and for allocating a unique identifier. The certificate may unattached or unlinked when sent to the certificate authority for generation and/or signing. In some implementations, obtaining the browser certificate includes the browser instance compiling a certificate signing request (CSR) including the necessary data elements (e.g. the public key) for inclusion in the browser certificate and sending the certificate signing request to the CA for signing and/or issuing the browser certificate. The data elements may be devoid of any personal or privacy leaking information (such as the type of information typically used in browser fingerprinting). Hence, the resulting browser certificate may be devoid of any personal or privacy leaking information. Obtaining the browser certificate may include obtaining an unattached or unlinked browser certificate for avoiding privacy leakage. The browser certificate (253) is sent (215) to the server (16) and also stored (216) at a storage (250) provided by the browser instance that is accessible to the browser instance during an active browser session with the web domain (251) with the browser certificate (253) stored as extractable from the storage (250). The generation and storing of the key pair and browser certificate for the browser instance at the web domain is carried out automatically in a frictionless manner without the user's knowledge.

The instructions provided to the browser instance to determine if the browser instance has a certificate and/or the instructions (202) to the browser instance to obtain the key pair and certificate may be transmitted by the server to the browser in the form of executable code (such as JavaScript, a trade mark of Oracle Corporation). The executable code may be served to the browser instance in a web page of the web domain. The executable code may include instructions to; check if a certificate is stored in the browser storage (250); if not, to obtain the key pair and the browser certificate and store them in the browser storage (250); and, to transmit the browser certificate to the server for registration or as an identity claims, as the case may be.

In this way, the web browser instance (210) at the user computing device (34) may obtain (212) a key pair for a unique combination of the web domain and the web browser and may obtain (213) an associated browser certificate for sharing the public key of the key pair. The browser certificate may include a unique identifier which may be used to identify the browser instance (210) during a subsequent browser session. The unique identifier may also be registered by the server in association with a registered user and subsequently usable by the server in identifying a user record associated with the browser certificate.

The private key (252) and the browser certificate (253) are stored (215) in web browser storage (250) in association with the web domain (251) and/or the domain name. The storage (250) may be provided by the web browser that is accessible to only the web browser during an active browser session with the web domain and the storage may store the private key with restricted access such that the private key is not extractable from the storage (250). In one example implementation, the web browser storage (250) may be provided by Indexed Database API. Indexed Database defines an API for a database of records holding simple values and hierarchical objects with each record having a key and some value. The key pair may be stored in the web browser storage such that that the private key is unextractable and the public key is extractable. The private key may be stored with configuration for use in signing operations such that data elements can be signed using the private key without the private key actually being retrieved or revealed. The public key may be stored configured for use in verifying operations. The private key (252) and the browser certificate (253) may be used for multiple subsequent sessions between the web browser instance (210) of the computing device (34) and the server (16) hosting the web domain. The web browser storage (250) may be clearable by the user and may for example be automatically cleared by the browser instance operating in a privacy mode after closing the browser instance. This gives a user of the browser instance control to replace a private key and browser certificate as frequently as they like or in response to a security breach known to the user.

A registration session at the server (16) side may include various steps for registration of the web browser instance (210) as relating to a registered user. This may include registering and authenticating a registered user by receiving and validating credentials associated with the registered user involving interaction with the user, and instructing (202) the web browser to generate and store a key pair; and, receiving (203) and registering in association with the registered user, a browser certificate including the public key of the generated key pair.

Once a registration session has been carried out, a new session may be started (231) by the user in the web domain at the web browser instance (210) of the computing device (34) and the server (16) may receive a session request (221). Starting (231) a new session may include transmitting identification data from the browser session to the server (16), the identification data being usable in linking the browser session to a user record associated with a registered user. In some implementations, the identification data is included in the browser certificate read from the browser instance (210).

The server (16) may send (222) a challenge request to the web browser and the method at the computing device (34) may send a challenge response (232) using the private key. The challenge response (232) may be validated (223) at the server (16) by using the public key as provided in the browser certificate (253). The challenge request (222) may include a cryptographic token or nonce and validating (223) the challenge response may include receiving a challenge response including a set of data elements corresponding to an encryption by the computing device (34) of the cryptographic token using the private key which is securely stored at the web browser and accessible only to the web browser during an active browser session with the web domain, and decrypting the set of data elements using the public key and comparing a result of the decryption against the cryptographic token. In other implementations, the challenge response may include the server encrypting and transmitting data using the browser certificate public key and the browser decrypting the encrypted data using the browser private key and returning the decrypted data to the server for validation.

In some use cases, the browser certificate is used as an identification claim in a request to the server and successful validation of the challenge-response confirms or validates the identity claim. In some use cases, no further user identification or authentication is required, and the user may be allowed to continue to interact with the web domain using the browser instance.

The challenge request and response may be utilised to determine a trust indicator of the browser session and, if the trust indicator is insufficient, one or more additional identification and authentication methods may be used. The browser certificate indicates that an identified browser instance is being used that has previously been identified. Attributes such as a registered user, risk data and other attributes may be associated with the browser instance.

Additionally, risk data may be transmitted (233) to or be otherwise accessible by the server (16) for interpretation by the server in determining a risk level associated with the browser session. The server (16) may receive (224) and interpret risk data to determine a risk level associated with the browser session and this may be incorporated into the trust indicator. The risk data may include one or more risk factors selected from a list including: data relating to user characteristics, device characteristics, browser location, user behavioural data, or a lack of a legitimate browser certificate or browser fingerprint or unsuccessful challenge-response. If a new browser session is started that is not registered, if no response is received to a challenge request, or if there is another reason to believe the browser session is not to be trusted, further authentication is required. This may include the user being asked for a password, performing two-factor (or possession-based) authentication or, if risk factors require, proximity authentication of the two-factor authentication may also be performed.

The additional identification and authentication methods may be used in a multiple level approach with the number of levels required depending on the trust indicator. The levels may, for example, including requesting one or more of: a username and password, general possession-based (or second factor) authentication, and possession-based authentication (225) using a proximity-based acquisition to be performed by a registered user device.

Additional applications may be made of the key pair and browser certificate identifying a browser session of a browser instance at the web domain. A registered user may mark the browser instance as trusted and this may avoid the need to prove possession and may be used as a replacement for an additional authentication such as a one-time password. The private key may also be used to sign to prove that the browser instance was present during a transaction at the web domain, for example, by signing a browser fingerprint and timestamp, transaction related data or the like. Furthermore, the private key of the browser instance for the web domain may be used for decryption at the browser instance when receiving secure messages from the server of the web domain.

Figure 3A:
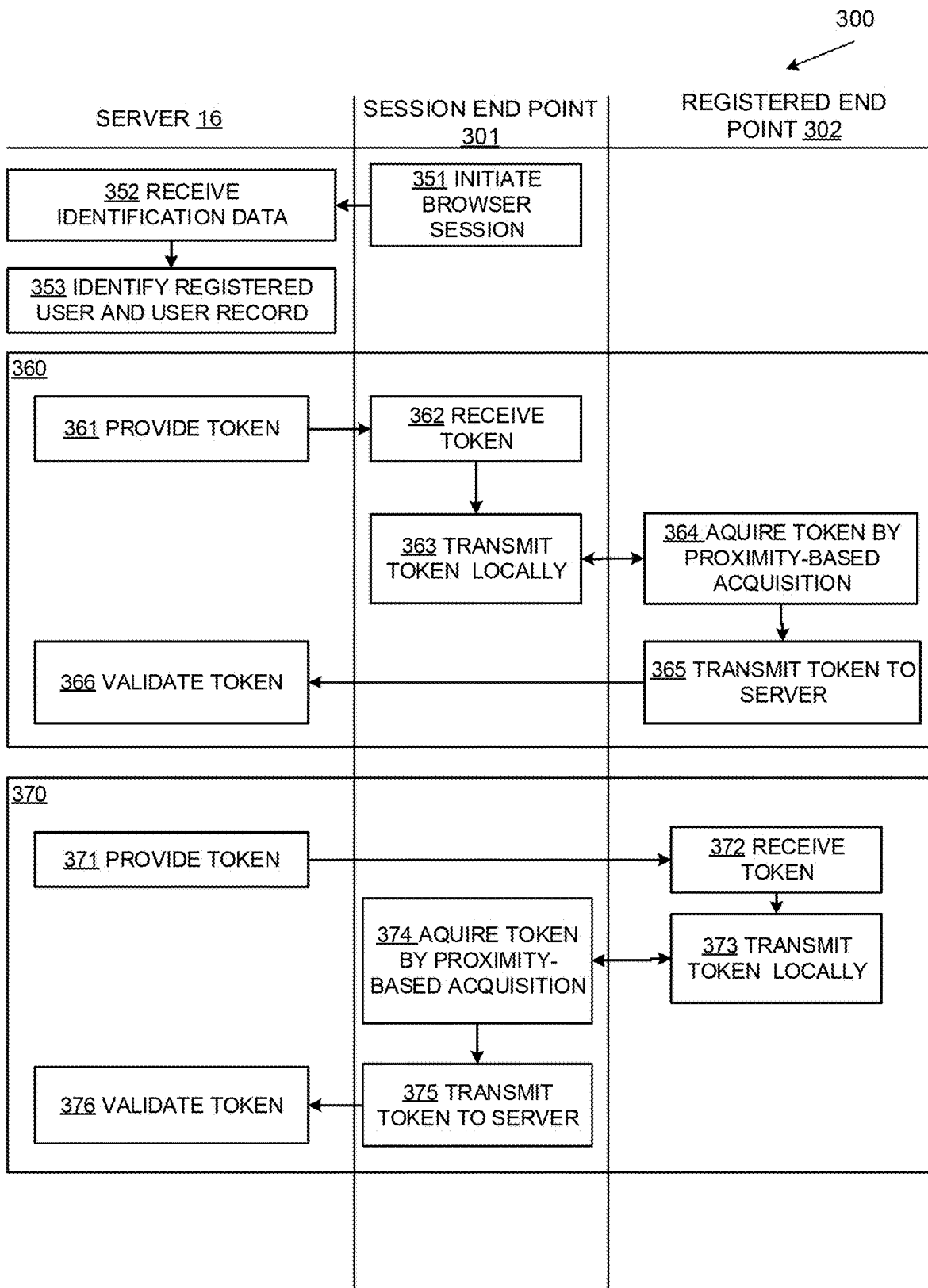
FIG. 3A is a swim-lane flow diagram which illustrates an exemplary method in accordance with another aspect of the present disclosure for proximity-based authentication.

Further details are now provided of the aspect of proximity-based authentication of two user end points executing on one or more computing devices. Referring to FIG. 3A, a swim-lane flow diagram (300) shows an example embodiment of a flow between a server (16), a session end point (301), and a registered end point (302). The session end point (301) may be executing or hosted on any computing device (34) on which a user is carrying out a primary user session with a service provided by the server (16). The session end point may for example be a browser instance, a software application or the like which executes on a computing device and via which the user can interact with the service (16) over the primary session. The registered end point (302) may be executing on or hosted by any computing device (12) and may be registered with the service at the server (16) in association with a registered user. The registered end point may for example be a registered browser instance, an enrolled or registered software application executing on a registered device (12) of the like.

A primary user session may be started (351) on the session end point (301) and the server (16) may receive (352) identification data in some form to allow the service at the server (16) to identify (353) the registered user and link to a user record. The proximity-based authentication may then be carried out by two alternative routes shown in boxes (360) and (370) in FIG. 3A.

In a first route, the server (16) may provide (361) a token to the session end point (301), which receives (362) the token and transmits (363) the token locally from the session end point (301). The possible implementations of the transmission are discussed further below, and these may include displaying a visual token, emitting a localised sound or signal, etc. The registered end point (302) in close proximity to the session end point (301) acquires (364) the token and sends (365) this back to the server (16) for validation (366). The token may be encrypted with a public key associated with a private key securely stored in the registered end point and, before sending the token back to the server, the registered end point may decrypt it using the private key as a form of proof that the token has been obtained by and sent from the registered end point. Or, the token may be unencrypted and before sending it to the server, the registered end point may encrypt the token using its private key for validation by the server decrypting it using the associated public key stored in association with the user record.

In a second route, the server (16) may provide (371) a token to the registered end point (302), which receives (372) the token and transmits (373) the token locally from the registered end point (302). The token may be encrypted with a public key associated with a private key securely stored in the registered end point and, before transmitting the token, the registered end point may decrypt it using the private key as a form of proof that the token is emitted from the registered end point. Or, the token may be unencrypted and before transmitting it locally, the registered end point may encrypt the token using its private key for validation by the server decrypting it using the associated public key stored in association with the user record. The possible implementations of the transmission are discussed further below, and these may include displaying a visual token, emitting a localised sound or signal, etc. The session end point (301) in close proximity to the registered end point (302) acquires (374) the token and sends (375) this back to the server (16) for validation (376). The type of token and its transmission may vary depending on the type of device which hosts the end point from which it is transmitted and the type of device that hosts the end point that acquires it. For example, if the session end point (301) is hosted on a desktop computer, it may not have image capture functionality and so may need to acquire a signal or sound.

The token validation after such proximity-based acquisition between the two end points validates that the registered end point is in physical proximity to the session end point and that the user is in control of the session end point and is not subject to a social engineering or account takeover attack. The proximity-based authentication may be used in combination with a number of other authentications based on risk analysis and situational requirements.

The method of FIG. 3A may find application in a wide variety of implementations. One example implementation includes the session end point being hosted on a home assistant device which has a primary user session with a service, being an online retailer, for example. The user may for example be purchasing items via the primary user session and payment for the transaction may be contingent the proximity-based authentication. As described above, the proximity-based authentication may include the home assistant device emitting the token via a speaker and the registered end point, being for example a banking application executing on a user computing device, such as a mobile phone, acquiring the sound-based token using a microphone and transmitting the token to the server to establish physical proximity of the session end point executing on the home assistant device and the registered end point during the primary user session. Other authentication factors may also be used as described herein, for example biometric authentication on the user's voice inputs via the primary session.

Figure 3B:
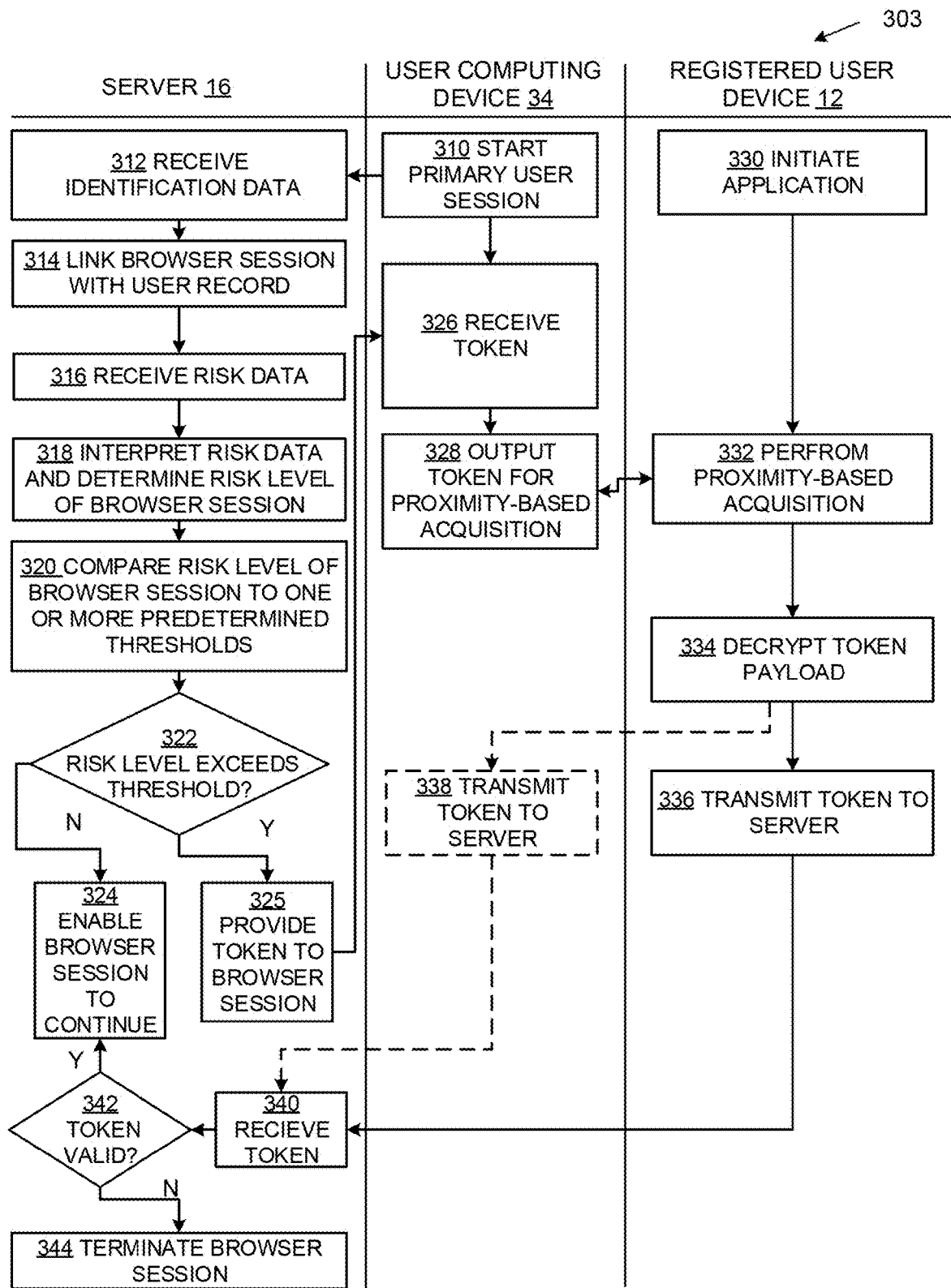
FIG. 3B is a swim-lane flow diagram of an example embodiment of the method of FIG. 3A.

Referring to FIG. 3B, an example method of possession-based authentication using proximity-based acquisition according to another example implementation is shown in a swim-lane flow (303) and this may include the computing device (34) receiving a token from the server (16) and outputting (234) the token for proximity-based acquisition by a registered user device (12) associated with the user record. Proximity-based acquisition may include one or more of: electro-magnetic-based (e.g. NFC, BLE, etc.), optical-based (e.g. using a graphical token, such as a QR code), or sound-based communication between eh computing device and the registered user device. The registered user device (12) performs (241) proximity-based acquisition including transmitting a captured token to the server (16) to establish physical proximity of the registered device (12) and the web browser and/or browser session.

The system (10) described above may implement a method (300, 303) for validation of a possession-based authentication response received from a registered device. An example embodiment of the method (303) is illustrated in the swim-lane flow diagram of FIG. 3B (in which respective swim-lanes delineate steps, operations or procedures performed by respective entities or devices). The browser session (14) may be initiated (310) on the user computing device (34) using a web browser. The identification data may be received (312) from the browser session at the server (16). Next, the server (16) may link (314) the browser session (14) with the user record (28). The risk data (40) may be received (316) and/or monitored by the server (16). The server (16) may interpret (318) the risk data (40) and determine the risk level (42) of the browser session (14), and compare (320) it to one or more predetermined thresholds. If the risk level does not exceed a first predetermined threshold, the browser session may be allowed to continue without further authentication.

In some cases, the risk level (42) may require initiation of possession-based authentication in terms of which the server sends a possession-based authentication request to the registered user device (12) and receives a possession-based authentication response (44) from the registered user device (12) indicating the user's (12) desire to proceed with the transaction. This may include transmitting a prompt to the registered user device for display to the user (e.g. "Do you want to pay Bob USD50?") and receiving the user's approval or rejection in response. The possession-based authentication request may include data for signing by a private key securely stored by the registered user device. The possession-based authentication response (44) may include data having been signed using the private key (30.2) securely stored at the registered user device (12) and which private key (30.2) may have a corresponding public key (30.1) stored in, or associated with the user record (28) such that the possession-based authentication response (44) can be validated as having originated from the registered user device (12).

The server may detect that the risk level exceeds a second predetermined threshold. If the risk level (42) does not exceed the second predetermined threshold, the browser session may be enabled (324) to continue without further authentication. If the risk level exceeds (322) the second predetermined threshold, validation of the possession-based authentication response (44) may be required. Validation of the possession-based authentication response (44) may entail checking to determine whether the received possession-based authentication response (44) can be considered to be valid (i.e. sent by the authorised user (20) who has full knowledge of the transaction to which the response relates). Such validation may include the server providing (325) a token (60) to the web browser via the browser session (14). This may include transmitting the token to the computing device for output thereat. In case the risk level (42) does exceed the threshold (and in some implementations if the trust indicator referred to above is not present), then the token (60) may be transmitted to the browser session (14) and received (326) by the computing device (34). The computing device (34) may output (328) the token for proximity-based acquisition by the registered device.

In some implementations, the server may transmit an acquisition prompt message to the registered device prompting acquisition of the token from the browser session using the registered device. The acquisition prompt message may for example be a USSD message, SMS message or notification message sent to the software application. In some implementations, the acquisition prompt message may include a report initiation element. The report initiation element may be a graphical icon or the like which can be activated through user input (e.g. by clicking on the icon). The report initiation element may, upon activation through user input, transmit a report message to the server. The report message may report suspicious activity. The report initiation element may for example be a graphically rendered button or text which reads "I am not at my browser", "No QR code is visible" or the like.

Figure 5:
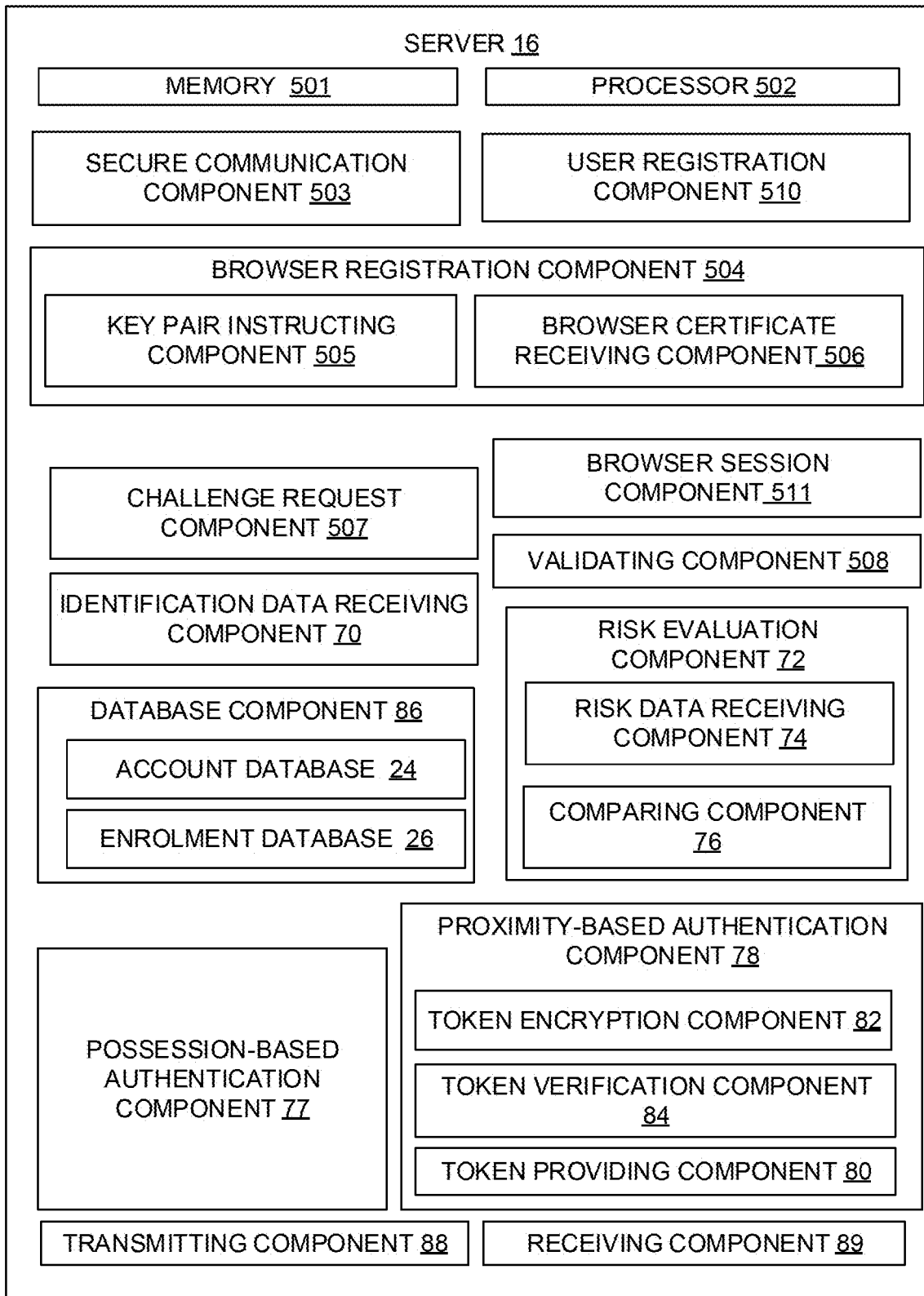
FIG. 5 is a high-level block diagram illustrating components of an exemplary server according to aspects of the present disclosure.

The user (20) may then be prompted to perform proximity-based acquisition. The user may be required to initiate (330) the application (17) on the registered user device (12), whereafter the proximity-based acquisition (58) may be performed (332) using the registered user device (12) (for example taking a picture of the QR code displayed via the browser session or otherwise obtaining the token). A payload of the token (60) may be decrypted (334) by the registered user device (12) (e.g. using the private key (30.2) known only to the registered user device (12)), whereafter the token (60), or the result (62) may be transmitted (336) by the registered user device (12) back to the server (16). In some implementations, the result (62) may be encrypted using the private key (30.2) prior to transmission to the server (16). The result (62) may for example be decrypted data obtained from the QR code or token. Optionally, the token (60) or result (62) may be transmitted (338) to the server by using the user computing device (34) as shown in FIG. 5. The token (60) or result (62) may then be received (340) by the server (16) and the server (16) may then verify (342) the validity of the token or result. This may include decrypting the token (60) using the corresponding public key (30.1) associated with the user record (28) and/or otherwise validating that the token (60) is received from the registered user device (12) (and not from a spurious device (46, 47)). If the token or result is found to be valid, the browser session (14) may be enabled to continue (324). If not, the browser session may be terminated (344) or aborted by the server (16).

A legitimate user (20) may become a victim of fraud and an unauthorised user (39) such as a hacker or unscrupulous party or fraudster may attempt to access the user account (29) of the legitimate user (20). The unauthorised user (39) may attempt to interact with the server computer (16) via a browser session (15) initiated from an unauthorised computing device (46). Such a browser session may be termed an "illegitimate browser session" herein in that the authorised user is not in control of the browser session. The unauthorised user (39) may be located at a location (41) which may be a different physical location from the user location (32) of the legitimate user (20). It should be appreciated that even though the risk data (40) is shown in FIG. 1 as originating from the unknown location (41), the risk data may also originate from a known location. The illegitimate browser session (15) may be initiated from the unauthorised computing device (46) of the unauthorised user (39).

The unauthorised user (39) may have obtained access to the user's (20) username and password, for example by sending the user a link which appears or purports to be from the bank (18) of the user (20). The unauthorised user (39) may have further obtained access to a communication address by way of which the unauthorised user (39) can contact the legitimate user (20) (e.g. a telephone number). This may be done during the same phishing attack. A first layer of security (the knowledge factor) may thus have been compromised or breached by the unauthorised user (39). Having obtained the username and password of the legitimate user (20), the unauthorised user (39) may now attempt to log into an internet banking portal of the legitimate user (20) via the illegitimate browser session (15) using the computing device (46) from the location (41) of the unauthorised user (39). The unauthorised user (39) may then for example attempt to register as a beneficiary of or otherwise transact against the user account (29). The unauthorised user (39) may then attempt to breach a second layer of security (in other words the possession factor) by phoning or contacting the legitimate user (20), purporting to be a representative of the bank (18), and may ask the legitimate user (20) to respond positively to a possession-based authentication request having been transmitted from the server (16) to the registered user device (12).

Responding positively to (or accepting) the possession-based authentication request may cause a possession-based authentication response (44) (or acceptance) to be transmitted from the registered user device (12) to the server (16). Receipt of this response may indicate (albeit falsely, in this case) to the server (16) the legitimate user's (20) intention to proceed to with the transaction which was actually initiated or requested by the unauthorised user (39). Thus, when the possession-based authentication request is accepted by the user (20), the possession factor may have been breached by the unauthorised user (39). It will be appreciated that other methods of intercepting, compromising or breaching legitimate communications between the legitimate user (20) and the server (16) may also be possible.

In the above example scenario, the server may ascertain that a risk level determined by interpreting risk data exceeds one or more predetermined thresholds. Risk data may be received from numerous sources, for example the illegitimate browser session that is attempting to transact against the user account, the registered user device, a banking backend (e.g. reflecting transaction data associated with the user account), a payment card industry network and the like. It should be appreciated that in some implementations, the server computer may have access to a risk engine at which the risk data is interpreted and from which the risk level is received. In response to such a determination and order to increase security, the server (16) may determine validation of the possession-based authentication response is required. Validation may be a proximity-based validation.

The server computer may for example provide a token (60) to the browser session via which the transaction request was initiated. In the example scenario described above, where the transaction request originated via the illegitimate browser session (15), the token will be provided to the illegitimate browser session (15). Of course, if the transaction had been initiated via the legitimate browser session (14) (and if the risk level had still exceeded the predetermined threshold), the token would be provided to the legitimate browser session (14). The token may be configured for proximity-based acquisition (58) by the registered user device (12).

The token (60) provided to the browser session (legitimate or illegitimate, as the case may be) may be an encrypted token including an encrypted payload. The token (60) may for example include a nonce or random number and the encrypted token may be rendered graphically, for example as a Quick Response (QR™) code. The user (authorised or unauthorised, as the case may be) may be prompted by the browser session to capture an image of the QR code using a camera of the registered user device (12), for example by pointing it at the browser displayed on a display associated with the relevant computing device. The token may be provided for proximity-based acquisition by way of optical-, radio-frequency- or sound-based acquisition. In some implementations, the token may be dynamic in that it changes with time over a predefined period (e.g. over 2 seconds), where acquisition of the token requires acquisition of the token over the entire period. Other tokens may also be used to perform the proximity-based acquisition (58). Once the proximity-based acquisition (58) is performed, a result (62) or verification is transmitted from the registered user device (12) back to the server (16). The result (62) may include the token (60) and/or the payload, and may be received by the server (16) to establish physical proximity of the registered device (12) and the relevant browser session and/or web browser. It should be appreciated that in scenarios in which the requested transaction is initiated via the illegitimate browser session (15), and in which the token (60) is provided to the illegitimate browser session (15), the registered user device (12) will not be available to (i.e. will not be physically proximate) the illegitimate browser session (15). The unauthorised user (39) will therefore not be able to perform the requested proximity-based acquisition (58) and the authentication will time out and fail. However, where the token (60) is provided to the legitimate browser session (14) (by virtue of the transaction being initiated therefrom), the authorised user (20) will be able to use the registered user device (12) to acquire the token (60) and transmit it or a derivative of it (the result (62)) back to the server (16).

The result (62) may thus provide proof that the registered user device (12) shares the same physical location as the web browser. In other words, the server may verify that the user location (32) is where the user computing device (34) and/or web browser from where the legitimate browser session (14) is initiated and the registered device (12) are located or that these devices and the legitimate browser session (14) are co-located.

The server (16) may be arranged to continually assess and monitor the risk data (40) and to update the risk level (42) in real time. If the legitimate browser session (14) is active and the server (16) receives the possession-based authentication response (44) purporting to establish possession of the registered device (12), the server may step-up security if the trust indicator is also absent or insufficient.

The risk data (40) may include, but need not be limited to, factors such as: data relating to user characteristics, device characteristics, browser location, user behavioural data, and/or lack of a legitimate browser fingerprint and/or challenge response and/or browser certificate. The user characteristics, device characteristics, browser location, user behavioural data and browser fingerprint may be monitored by the server (16) while updating the risk level (42) in real time. The risk factors may be uniquely associated with the user record (28) of the relevant user (20). The risk level (42) may be determined by the server (16) by comparing current risk data (40) to previously monitored data associated with the user record (28). The user behavioural data may include data relating to user typing speed, number of user errors made, or the like. Device characteristics may include data relating to device location, device identity, device type, or the like. For example, characteristics of the user computing device (34) or the registered user device (12) may be used.

The server (16) may be enabled to detect if the possession-based authentication response (44) originates from an unscrupulous or untrusted source. For example, the server (16) may be arranged to determine a source location (41) from where the purported possession-based authentication response (44) originates and if that source location (41) differs from a location (32) associated with the legitimate browser session (14), then providing the token (60) to the browser session (14) for proximity-based acquisition (58) by the registered device (12) associated with the user record (28) and/or with the user (20). It should be appreciated that if the trust indicator (described above) is present, it may not be necessary for the server to transmit the token (60) to the browser session (14) which may provide a streamlined user experience that need not limit or sacrifice security of the system (10). The system (10) may further provide protection for the user (20) against him or herself, as some users tend to be more gullible or susceptible to fraud. If the token or result (62) is not received back by the server, the browser session (14) or a transaction may be aborted or terminated. Control of origin of the browser session or of the registered user device may thus be established in an effort to alleviate fraud or other threats. The system (10) may be arranged to step-up or increase security in real time when the risk level (42) exceeds the threshold (i.e. when a threat arises). This may alleviate attacks such as attacks utilising browser fingerprint copying or the like. The system (10) may be arranged to utilise "piggybacking" whereby the server (16) piggybacks on a known, trusted device (12) to verify a browser session (14) requiring the user (20) to prove that the registered user device (12) is nearby or proximate to a location (32) associated with the browser session (14).

The browser session (14) may be authenticated/validated by the server (16) during an event which may have a relatively high-risk level (42) associated therewith. For example, such a high-risk event may include any one or more of: a transaction of an amount of money that is above a predetermined amount, the process of adding or registering a new beneficiary, etc. The system and methods described herein may thus provide an unpredictable step-up in security which may make it more difficult or near-impossible for unauthorised users to gain access to user accounts (29). This unpredictable step-up may occur later in a "life cycle" of the browser session (14).

Figure 4:
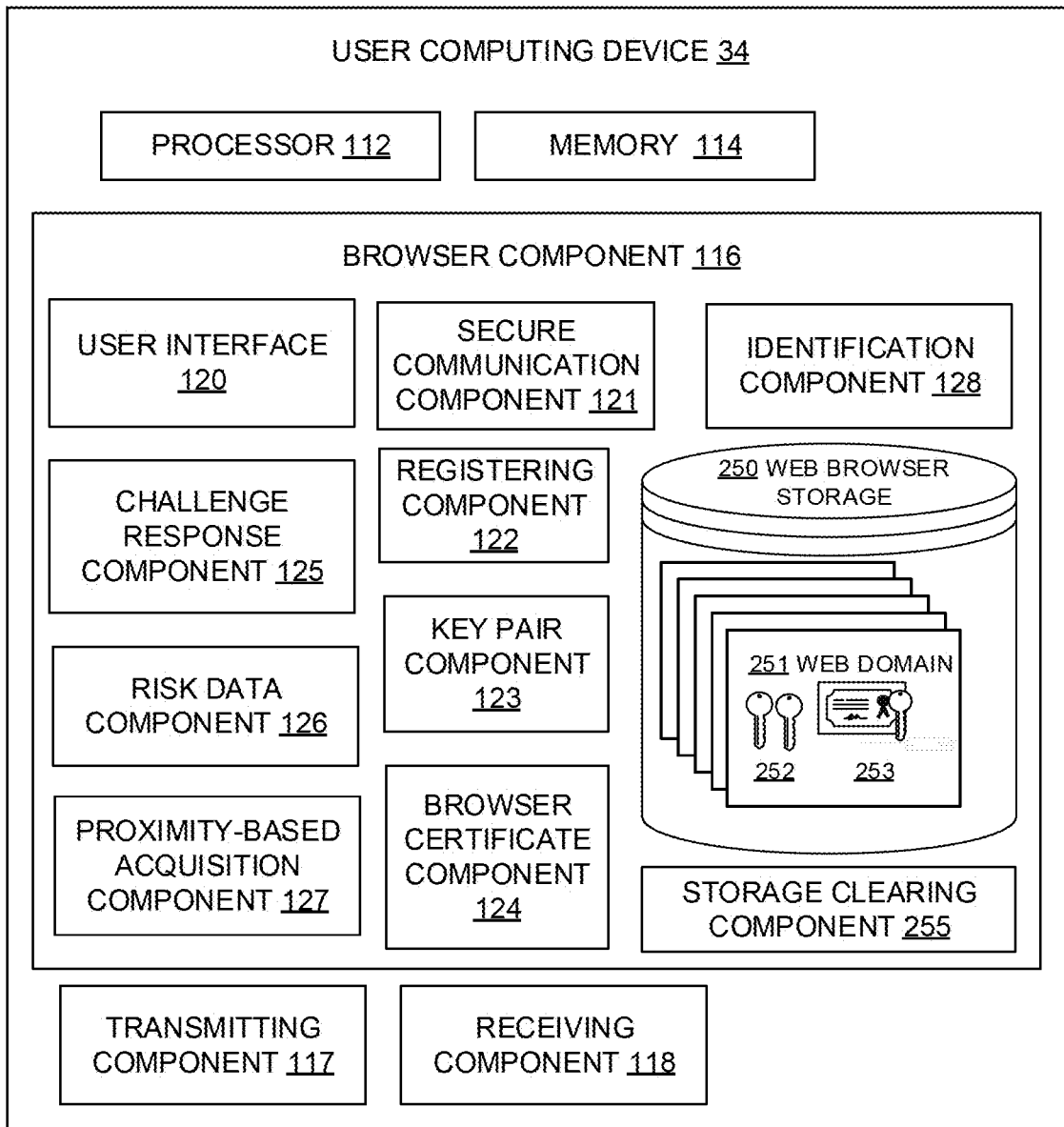
FIG. 4 is a high-level block diagram illustrating components of an exemplary user computing device according to aspects of the present disclosure.

An exemplary embodiment of the user computing device (34) is shown in the high-level block diagram in FIG. 4. The user computing device (34) may be a personal computer of the user (20), however it should be appreciated that many other computing devices may be used to initiate the browser session (14). The user computing device (34) may include a processor (112) for executing the functions of components described below, which may be provided by hardware or by software units executing on the user computing device (34). The software units may be stored in a memory component (114) and instructions may be provided to the processor (112) to carry out the functionality of the described components. In some cases, for example in a cloud computing implementation, software units arranged to manage and/or process data on behalf of the user computing device (34) may be provided remotely. Some of the components may be served to the computing device, e.g. in the form of executable code, by a server computer over a communication network. Such components may be served to the computing device (or a browser component of the computing device) during an active web session between a web browser instance and a web domain hosted by the server computer.

The user computing device may include a transmitting component (117) and a receiving component (118).

The user computing device (34) may include a web browser component (116) which may be an application executable by the processor (112). The web browser component (116) may be capable of executing a browser session with a server computer addressable via a domain name. The web browser component (116) may include a user interface (120) and a secure communication component (121).

The web browser component (116) may include a registering component (122) for registering the web browser at the server computer in association with the web domain. The web browser component (116) may include a key pair component (123) for obtaining a private key and a public key of a key pair unique to a combination of a web domain and the web browser and a browser certificate component (124) for obtaining and transmitting a browser certificate including the public key unique to the combination of the web domain and the web browser. The web browser component (116) includes a storage component (250) for storing key pairs (252) and the associated browser certificates (253). The storage component (250) may be compartmentalised, partitioned or otherwise configured such that different web domains can be allocated their own partition of storage in which data can be stored for access by the relevant web domain only. Data stored in association with the web domain (251) may therefore only be accessible or usable during an active browser session between a web browser instance and the web domain. Data stored in association with the web domain (251) in the storage component (250) is accessible to only the web browser during an active browser session with the web domain and in which the private keys are stored as unextractable from the storage (250). In some implementations, the web browser storage (250) is compartmentalised or partitioned such that different browser instances of the browser component (116) are allocated different sections or compartments or partitions of the web browser storage (250). For example, the browser component may support a regular browser instance and a privacy mode browser instance, each of which may have its own compartment or partition for storing data associated with different web domains.

The web browser component (116) may include a storage clearing component (255) configured to clear the web browser storage (250). The storage clearing component (255) may be configured to clear the web browser storage responsive to receiving a user instruction to clear the storage. The storage clearing component may be configured to automatically clear the storage (e.g. without the user specifically requesting the clearing) in response to the user terminating or closing the browser instance having been executing in a privacy mode. This may include clearing only a partition or compartment of the browser storage that is allocated to the privacy mode browser instance. Clearing the storage may include permanently deleting the contents of the storage, including for example any key pairs and browser certificates. The storage clearing component (255) may therefore provide the user with control as to whether or not the browser instance can be identified by the server and privacy conscious users may choose not to in favour of more burdensome authentication (e.g. using user name and password and/or two factor authentication when initiating each new session with the web domain).

The web browser component (116) may include an identification component (128) for transmitting identification data from a browser session to a server, the identification data being usable in linking the browser session to a user record associated with a registered user and a challenge response component (125) for using the private key, the public key and the browser certificate in a challenge-response with the server hosting the web domain.

The web browser component (116) may include a risk data component (126) for transmitting risk data to the server for interpretation by the server in determining a risk level associated with the browser session and a proximity-based acquisition component (127) for receiving a token from a server and outputting the token for proximity-based acquisition by a registered user device associated with the user.

Referring now to FIG. 5, there is shown a high-level block diagram of an exemplary server (16) which may form part of the system (10). The server (16) may include a memory (501) for storing computer-readable program code and a processor (502) for executing the computer-readable program code. The processor (502) may be arranged for executing the functions of components described below, which may be provided by hardware or by software units executing on the server (16). The software units may be stored in the memory component (501) and instructions may be provided to the processor (502) to carry out the functionality of the described components. In some cases, for example in a cloud computing implementation, software units arranged to manage and/or process data on behalf of the server (16) may be provided remotely.

The server (16) may include a secure communication component (503) for facilitating secure communications with the registered user device (12) and/or with the user computing device (34). The server (16) may further include an identification data receiving component (70) arranged to receive the identification data (38) from the browser session (14), the identification data being usable in linking the web browser and/or browser session (14) to the user record (28). A database component (86) may be provided at the server (16), which may include the account database (24) and the enrolment database (26) as described above. The server (16) may also include a transmitting component (88) as well as a receiving component (90).

The server (16) may include a browser registration component (504) for registering the web browser instance at the server in association with a web domain and a user registration component (510) for registering a registered user and for authenticating the registered user, including receiving and validating credentials associated with the registered user, The browser registration component (504) may include a key pair instructing component (505) for instructing the web browser to generate and store the key pair and a browser certificate receiving component (506) for receiving and registering in association with the registered user the browser certificate including the public key. The server (16) may include a browser session component (511) for reading a browser session to determine if a browser certificate exists for the browser instance being used to access the web domain in the browser session. The key pair instructing component (505) and browser session reading component (511) may transmit instructions to the browser instance to instruct the browser instance to determine if a certificate exists for the web domain; if not, to generate a key pair and obtain a certificate; and to transmit the certificate to the server.

The server (16) may include a challenge request component (507) for transmitting and validating a challenge request to the web browser and a validating component (508) for validating the registered user in the event that a challenge response is received to the challenge request.

A risk evaluation component (72) may be arranged to receive and interpret the risk data (40) to determine the risk level (42) associated with the browser session (14). The risk evaluation component (72) may include a risk data receiving component (74) as well as a risk comparing component (76). The risk evaluation component (72) may include a detection component arranged to detect that the risk level exceeds one or more predetermined thresholds.

The server (16) may also include a possession-based authentication component (77) and a proximity-based authentication component (78). The possession-based authentication component (77) may be arranged to transmit a possession-based authentication request to a registered user device and receive a possession-based authentication response (44) purporting to establish possession of the registered device (12). The proximity-based authentication component (78) may include a token providing component (81) arranged to provide a token (60) to the browser session (14) for proximity-based acquisition (58). The server may yet further include a token encryption component (82) arranged to encrypt the token (60) and a token verification component (84) arranged to verify a received token (60) or response (62).

Figure 6:
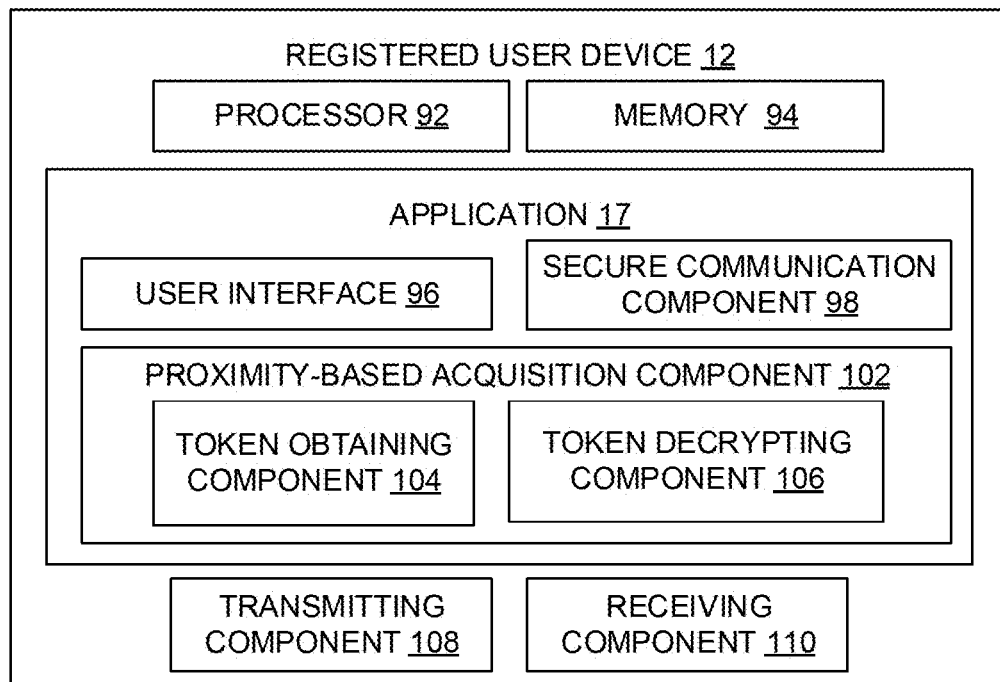
FIG. 6 is a high-level block diagram illustrating components of an exemplary registered user device according to aspects of the present disclosure.

In FIG. 6 is shown a high-level block diagram of an exemplary registered user device (12) which may form part of the system (10). The registered user device (12) may include a processor (92) for executing the functions of components described below, which may be provided by hardware or by software units executing on the registered user device (12). The software units may be stored in a memory component (94) and instructions may be provided to the processor (92) to carry out the functionality of the described components. In some cases, for example in a cloud computing implementation, software units arranged to manage and/or process data on behalf of the registered user device (12) may be provided remotely. Some or all of the components may be provided by the software application (17) downloadable onto and executable on the registered user device (12). The registered user device (12) may include a user interface (96) and a secure communication component (98). The registered user device (12) may include a possession-based authentication component (99) which may be arranged to receive a possession-based authentication request and to transmit a possession-based authentication response purporting to establish possession of the registered device (12). A proximity-based acquisition component (102) may also be provided which may for example interface with a camera or other proximity communication-based transducer (e.g. contactless element, etc.) associated with the registered user device (12) to obtain a token from a browser session. A token obtaining component (104) and a token decrypting component (106) may be provided. The registered user device (12) may further include a transmitting component (108) and a receiving component (110).

Aspects of the present disclosure relate to identifying a browser instance over successive browser sessions between the browser instance and a particular web domain. The browser instance identification may be secure through use of a private key that is unique to the browser instance and web domain and that is unextractable (and hence cannot be retrieved or copied).

The browser instance identification aspects of the present disclosure may provide advantages over other identification techniques, for example browser fingerprinting, in that: the private key is unique to the browser instance and the web domain (e.g. the browser might store one private key for one web domain and another, different, private key for another web domain, further different instances of the browser component may be issued different key pairs and corresponding certificates); the user has control over the private key (in that it can be deleted, meaning that the browser instance will thereafter not be identifiable by the web domain); the user has control of when to create new key pair and certificate and therefore the frequency of security updates; the private key is stored as unextractable (such that it cannot be retrieved or copied or determined by miscreants) but with configuration for use in signing and cryptography operations to demonstrate proof of ownership; the private key (and corresponding browser certificate) may be devoid of personal information of the user. Aspects of the present disclosure may therefore enhance security and user privacy.

Figure 7:
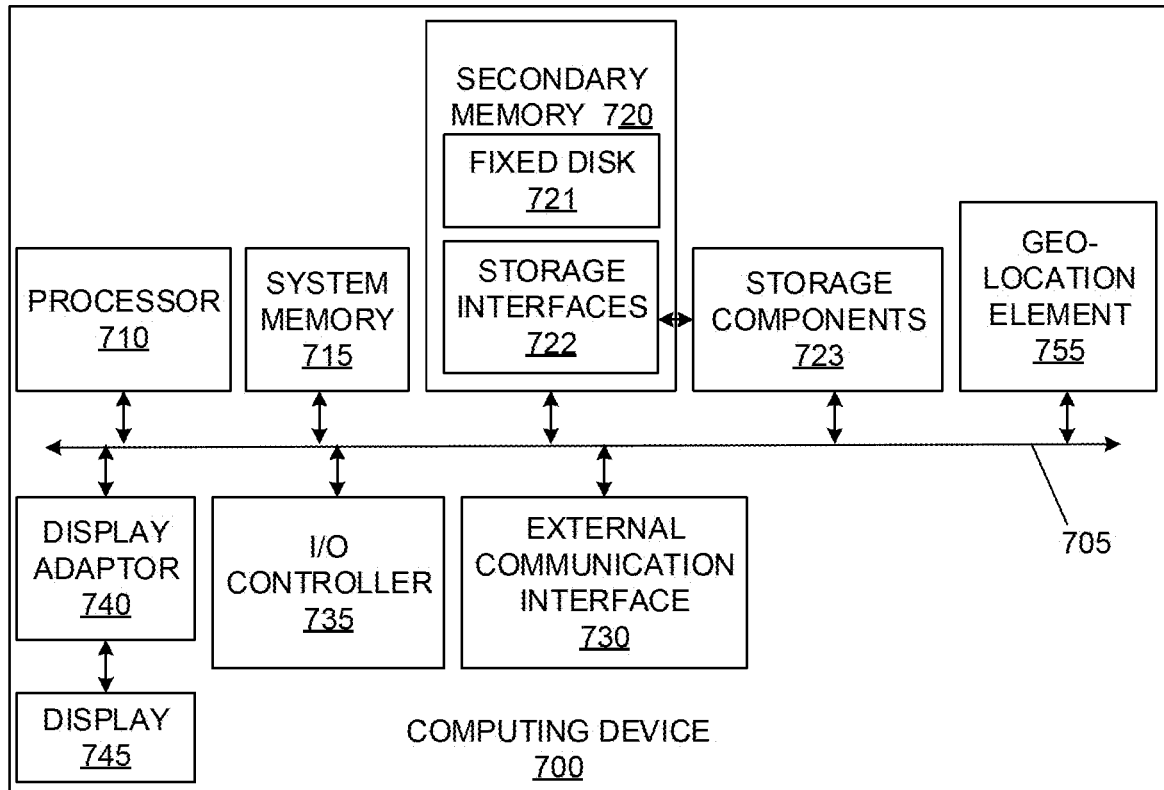
FIG. 7 illustrates an example of a computing device in which various aspects of the disclosure may be implemented.

FIG. 7 illustrates an example of a computing device (700) in which various aspects of the disclosure may be implemented. The computing device (700) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (700) may be suitable for storing and executing computer program code. The various participants and elements in the previously described system diagrams may use any suitable number of subsystems or components of the computing device (700) to facilitate the functions described herein. The computing device (700) may include subsystems or components interconnected via a communication infrastructure (705) (for example, a communications bus, a network, etc.). The computing device (700) may include one or more processors (710) and at least one memory component in the form of computer-readable media. The one or more processors (710) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (700) may be distributed over a number of physical locations (e.g. in a distributed, cluster or cloud-based computing configuration) and appropriate software units may be arranged to manage and/or process data on behalf of remote devices.

The memory components may include system memory (715), which may include read only memory (ROM) and random-access memory (RAM). A basic input/output system (BIOS) may be stored in ROM. System software may be stored in the system memory (715) including operating system software. The memory components may also include secondary memory (720). The secondary memory (720) may include a fixed disk (721), such as a hard disk drive, and, optionally, one or more storage interfaces (722) for interfacing with storage components (723), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (700) may include an external communications interface (730) for operation of the computing device (700) in a networked environment enabling transfer of data between multiple computing devices (700) and/or the Internet. Data transferred via the external communications interface (730) may be in the form of signals, which may be electronic, electromagnetic, optical, radio, or other types of signal. The external communications interface (730) may enable communication of data between the computing device (700) and other computing devices including servers and external storage facilities. Web services may be accessible by and/or from the computing device (700) via the communications interface (730).

The external communications interface (730) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry. The external communications interface (730) may include a subscriber identity module (SIM) in the form of an integrated circuit that stores an international mobile subscriber identity and the related key used to identify and authenticate a subscriber using the computing device (700). One or more subscriber identity modules may be removable from or embedded in the computing device (700).

The computer-readable media in the form of the various memory components may provide storage of computer-executable instructions, data structures, program modules, software units and other data. A computer program product may be provided by a computer-readable medium having stored computer-readable program code executable by the central processor (710). A computer program product may be provided by a non-transient computer-readable medium, or may be provided via a signal or other transient means via the communications interface (730). Interconnection via the communication infrastructure (705) allows the one or more processors (710) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (700) either directly or via an I/O controller (735). One or more displays (745) (which may be touch-sensitive displays) may be coupled to or integrally formed with the computing device (700) via a display (745) or video adapter (740).

The computing device (700) may include a geographical location element (755) which is arranged to determine the geographical location of the computing device (700). The geographical location element (755) may for example be implemented by way of a global positioning system (GPS), or similar, receiver module. In some implementations the geographical location element (755) may implement an indoor positioning system, using for example communication channels such as cellular telephone or Wi-Fi™ networks and/or beacons (e.g. Bluetooth™ Low Energy (BLE) beacons, iBeacons™, etc.) to determine or approximate the geographical location of the computing device (700). In some implementations, the geographical location element (755) may implement inertial navigation to track and determine the geographical location of the communication device using an initial set point and inertial measurement data.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™ C++, or Perl™ using, for example, conventional or object-oriented techniques. The computer program code may be stored as a series of instructions, or commands on a non-transitory computer-readable medium, such as a random-access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

Some portions of this description describe the embodiments of the invention in terms of algorithms or symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

What is claimed is:

1. A computer-implemented method for proximity-based authentication, the method conducted at a server comprising:
receiving identification data from a primary user session on a session end point hosted on
a computing device, the identification data linking the primary user session to a user record associated with a registered user;
determining a trust indicator of the primary user session, and, when the trust indicator is insufficient, requiring proximity-based acquisition to be performed by a registered end point including providing a token to one of the session end point and the registered end point hosted on a computing device, the registered end point associated with the user record, for local transmission from the end point for proximity-based acquisition by the other one of the session end point and a registered end point; and
receiving the token from the other one of the session end point and the registered end point to establish physical proximity of the session end point and the registered end point during the primary user session.

2. The method as claimed in claim 1, including receiving and interpreting risk data to determine a risk level associated with the primary user session;
detecting that the risk level exceeds a predetermined threshold; and
in response to the detection, providing the token.

3. The method as claimed in claim 2, wherein the risk data includes one or more risk factors of the primary user session selected from a list including: data relating to user characteristics, device characteristics, browser location, user behavioural data, or a lack of a legitimate browser fingerprint.

4. The method as claimed in claim 2, including monitoring the risk data, and uniquely associating the risk data with the user record, and wherein determining the risk level includes comparing current risk data to previously monitored data associated with the user record.

5. The method as claimed in claim 1, wherein providing a token is initiated in response to receiving a possession-based authentication response purporting to establish possession of the registered end point uniquely associated with the user record.

6. The method as claimed in claim 5, wherein the method includes:
receiving the possession-based authentication response from the registered end point; and,
verifying the received possession-based authentication response including confirming that the possession-based authentication response is received from the registered end point,
wherein the possession-based authentication response indicates the registered user's intention to conduct a transaction.

7. The method as claimed claim 1, wherein the token is provided to the session end point, and wherein the method includes transmitting an acquisition prompt message to the registered end point prompting acquisition of the token from the primary user session using the registered end point.

8. The method as claimed in claim 7, wherein the acquisition prompt message includes a report initiation element which initiates transmission of a report message to the server, wherein the report message reports suspicious activity.

9. The method as claimed in claim 1, wherein the method includes utilising a challenge-response authentication to authenticate the primary user session.

10. The method as claimed in claim 1, wherein the method comprises a challenge-response authentication is-utilised to determine the trust indicator of the primary user session.

11. The method as claimed in claim 1, wherein the primary user session is a browser session and receiving the identification data from the browser session includes receiving a challenge-response including a challenge having been signed with a private key unique and accessible to the browser session and having a corresponding public key associated with the user record.

12. The method as claimed in claim 11, wherein the challenge-response is received together with a browser certificate, wherein the browser certificate is stored in a secure storage location accessible to the browser session while the browser session is active, and wherein the browser certificate includes the public key associated with the user record.

13. The method as claimed in claim 12, wherein the browser certificate is generated by a certificate authority which is in communication with the server and the method includes validating the browser certificate, and if the bowser certificate is valid, linking the browser session to the user record.

14. The method as claimed in claim 1, wherein the identification data includes any one or more of: a user name, a user password, a browser certificate, a browser fingerprint, or user biometrics which are associated with the user record.

15. The method as claimed in claim 1, wherein one or more steps are performed via computer-readable program code stored in a non-transitory computer-readable medium.

16. A computer-implemented method for proximity-based authentication, the method conducted at a computing device comprising:
transmitting identification data from a primary user session to a server, the identification
data in linking the primary user session to a user record associated with a registered user;
in response to the server determining that a trust indicator of the primary user session is insufficient, requiring proximity-based acquisition to be performed by a registered end point, either:
receiving a token from the server; and
outputting the token for proximity-based acquisition by the registered end point associated with the user record;
or:
acquiring a token by proximity-based acquisition from the registered end point associated with the user record; and
transmitting the token to the server to establish physical proximity of the registered end point and computing device of the primary user session.

17. The method as claimed in claim 16, including receiving a prompt to output the token or to acquire the token from the registered end point.

18. The method as claimed in claim 16, including transmitting risk data to the server for interpretation by the server in determining a risk level associated with the primary user session.

19. A system for proximity-based authentication, the system including a server having a memory for storing computer-readable program code and a processor for executing the computer-readable program code which causes the processor to perform operations of:

receiving identification data from a primary user session on a session end point hosted on a computing device, the identification data in linking the primary user session to a user record associated with a registered user;

determining a trust indicator of the primary user session, and, when the trust indicator is insufficient, requiring proximity-based acquisition to be performed by a registered end point including providing a token to one of the session end point and the registered end point hosted on a computing device, the registered end point associated with the user record, for local transmission from the end point for proximity-based acquisition by the other one of the session end point and a registered end point; and receiving the token from the other one of the session end point and the registered end point to establish physical proximity of the session end point and the registered end point during the primary user session.

20. The system as claimed in claim 19, wherein the computer-readable program code causes the processor to perform further operations of:

receiving and interpreting risk data to determine a risk level associated with the primary user session; and detecting that the risk level exceeds a predetermined threshold.

* * * * *